United States Patent
Lingeskog

(10) Patent No.: US 11,370,397 B2
(45) Date of Patent: Jun. 28, 2022

(54) WHEEL CLEANING DEVICE AND A METHOD FOR CLEANING WHEELS

(71) Applicant: Fredrik Lingeskog, Värnamo (SE)

(72) Inventor: Fredrik Lingeskog, Värnamo (SE)

(73) Assignee: Fredrik Lingeskog, Värnamo (SE)

( * ) Notice: Subject to any disclaimer, the term of this patent is extended or adjusted under 35 U.S.C. 154(b) by 113 days.

(21) Appl. No.: 16/344,048

(22) PCT Filed: Oct. 26, 2016

(86) PCT No.: PCT/EP2016/075746
§ 371 (c)(1),
(2) Date: Apr. 23, 2019

(87) PCT Pub. No.: WO2018/077396
PCT Pub. Date: May 3, 2018

(65) Prior Publication Data
US 2019/0256058 A1      Aug. 22, 2019

(51) Int. Cl.
*B60S 3/04* (2006.01)
*B08B 3/02* (2006.01)

(52) U.S. Cl.
CPC ............. *B60S 3/042* (2013.01); *B08B 3/022* (2013.01)

(58) Field of Classification Search
CPC .................................. B60S 3/042; B08B 3/022
See application file for complete search history.

(56) References Cited

U.S. PATENT DOCUMENTS 3,545,632 A * 12/1970 Cooper ................. B65G 57/00
414/27
3,955,491 A * 5/1976 McMahon .............. B65B 27/06
100/7

(Continued)

FOREIGN PATENT DOCUMENTS

CN            205552530 U   *  9/2016
DE             19952533 C2  *  4/2002  .............. B60S 3/042

(Continued)

OTHER PUBLICATIONS

Translation of DE 19952533. (Year: 2002).*

(Continued)

*Primary Examiner* — Alexander Markoff
(74) *Attorney, Agent, or Firm* — Renner, Otto, Boisselle & Sklar, LLP

(57) ABSTRACT

A wheel cleaning device (10) for cleaning vehicle wheels (12) having a rim and a tyre mounted on said rim is disclosed. The cleaning device (10) comprising a wheel cleaning zone (15) and a wheel conveying system (20) for conveying the wheels (12) to and from the wheel cleaning zone (15). The wheel conveying system comprises at least one vertically displaceable wheel engaging element (21, 22), and a wheel conveyor (20) extending at least partially in a horizontal direction, wherein the wheel conveying system is arranged for conveying wheels (12) individually, in consecutive order and in a lying position from a stack (14) of wheels (12) to the wheel cleaning zone (15) at least partially in the horizontal direction and then from the wheel cleaning zone (15) at least partially in the horizontal direction to output a stack (14) of cleaned wheels (12).

9 Claims, 13 Drawing Sheets

(56) References Cited

U.S. PATENT DOCUMENTS

Figure 1:
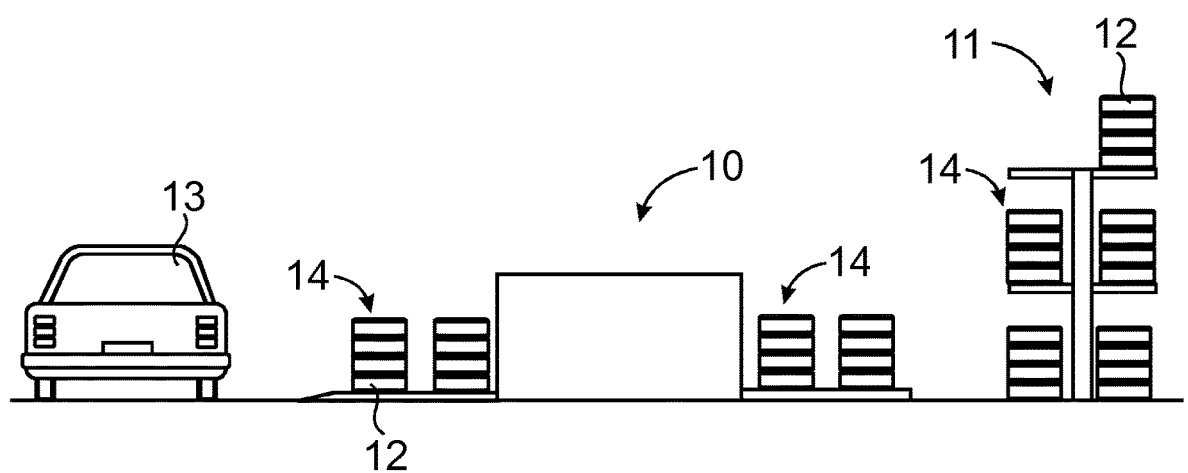

| | | | | |
|---|---|---|---|---|
| 4,222,323 | A * | 9/1980 | Martindale | B65B 13/18 100/102 |
| 4,763,392 | A * | 8/1988 | Fogal | B05D 7/16 152/513 |
| 4,789,015 | A * | 12/1988 | Flinn | B60C 25/132 141/38 |
| 4,829,749 | A * | 5/1989 | Hiyama | B29D 30/0016 193/35 G |
| 5,125,298 | A * | 6/1992 | Smith | B23P 19/006 29/798 |
| 5,640,750 | A * | 6/1997 | Yoshida | B23Q 7/1426 29/281.5 |
| 2008/0041426 | A1* | 2/2008 | Hansen | B60S 3/042 134/45 |
| 2010/0064868 | A1* | 3/2010 | Michael | B26D 3/005 83/54 |
| 2011/0048649 | A1* | 3/2011 | Komatsu | B23P 19/069 157/1.35 |
| 2011/0210023 | A1* | 9/2011 | DeForest | B65D 19/08 206/304.2 |
| 2012/0111808 | A1* | 5/2012 | Scholz | A47B 47/027 211/23 |
| 2016/0159326 | A1 | 6/2016 | Klemedtson | |
| 2016/0159586 | A1* | 6/2016 | Clark | B66C 1/66 414/796 |

FOREIGN PATENT DOCUMENTS

| | | | |
|---|---|---|---|
| JP | 2000237701 A | | 9/2000 |
| JP | 2013043730 A | * | 3/2013 |
| WO | 2016105306 A1 | | 6/2016 |

OTHER PUBLICATIONS

Translation of CN205552530U. (Year: 2021).*
Translation of JP2013043730A (Year: 2021).*
PCT International Search Report for corresponding International Application No. PCT/EP2016/075746 dated Jun. 20, 2017.

* cited by examiner

WHEEL CLEANING DEVICE AND A METHOD FOR CLEANING WHEELS

FIELD OF THE INVENTION

This application is a national phase of International Application No. PCT/EP2016/075746 filed Oct. 26, 2016 and published in the English language, which is hereby incorporated by reference.

The present invention relates to a wheel cleaning device. More specifically, the present invention relates to a device for cleaning vehicle wheels having a rim and a tyre mounted on said rim. Wheel cleaning devices of this type are generally used in tyre shops to clean wheels which have been used. Wheel cleaning devices are, for example, used for cleaning wheels in connection with a change of wheels, such as between a set of wheels with ordinary tyres (also called summer tyres) to a set of wheels with winter tyres (also called snow tyres). Such wheel cleaning devices can also be used for cleaning wheels in connection with a tyre change, wherein the same rims are to be used again, or in connection with fixing one or more damaged tyres, such as a flat or punctured tyre. The present invention also relates to a method for cleaning wheels.

PRIOR ART

There are several different types of wheel cleaning devices in the prior art. One such type of wheel cleaning device comprises a washing chamber, wherein a wheel is positioned in the washing chamber for automatic washing of the wheel therein. Then, the clean wheel is manually removed from the washing chamber for storing or mounting on a vehicle. Another prior art wheel cleaning device comprises a washing chamber and a conveyor for continuously conveying wheels lying on the conveyor through the washing chamber.

A problem with such wheel cleaning devices according to prior art is that they are inefficient.

Another problem of such prior art wheel cleaning devices is that they are labour intensive and non-ergonomic, which results in expensive operation and a considerable risk of personnel injury.

SUMMARY OF THE INVENTION

An object of the present invention is to avoid the problems of the prior art and provide an improved wheel cleaning device and method. The present invention results in efficient handling and cleaning of wheels, wherein the wheels of a stack of wheels, such as a set of wheels from a vehicle, efficiently is cleaned and stacked for further handling, such as storage or mounting on the vehicle. According to the present invention a set of wheels from a single vehicle is arranged as a stack of wheels, wherein the wheels of said stack is subject to cleaning and a corresponding stack of clean wheels is provided for further handling, such as storage or mounting on the vehicle.

The present invention relates to a wheel cleaning device for cleaning vehicle wheels having a rim and a tyre mounted on said rim, said cleaning device comprising a wheel cleaning zone and at least one wheel conveying system for conveying the wheels to and from the wheel cleaning zone, characterised in that the wheel conveying system comprises at least one vertically displaceable wheel engaging element, and a wheel conveyor extending at least partially in a horizontal direction, wherein the wheel conveying system is arranged for conveying wheels individually, in consecutive order and in a lying orientation from a stack of wheels to be cleaned to the wheel cleaning zone at least partially in a horizontal direction and then output a stack of cleaned wheels. The vertically displaceable wheel engaging element in combination with the conveyor for conveying lying wheels to and from, and optionally also through, the cleaning zone results in the possibility of efficient cleaning and handling of wheels, wherein a stack of wheels consisting of a set of wheels from a single vehicle, such as an automobile, can be inputted in the wheel cleaning device for cleaning and then outputted as a stack of cleaned wheels in a predetermined location.

For example, the wheel engaging element can be arranged as a vertically displaceable wheel gripping device for gripping one or more wheels of the stack. The wheel gripping device can be arranged for collecting and transporting a single wheel in a lying orientation to and from the wheel cleaning zone. The wheel gripping device can be arranged for collecting the uppermost wheel of the stack. Alternatively, the wheel gripping device can be arranged for gripping a plurality of wheels from the stack so as to allow for the lowermost wheel thereof to be conveyed to the wheel cleaning zone by the conveyor.

Alternatively, a first wheel engaging element can be arranged as a vertically displaceable first wheel support for supporting a stack of wheels to be cleaned, and a second wheel engaging element can be arranged as a vertically displaceable second wheel support for receiving cleaned wheels, wherein the wheel conveyor is arranged for conveying wheels individually, in consecutive order and in a lying position from the first wheel support to the second wheel support via the wheel cleaning zone at least partially in a horizontal direction to output a stack of cleaned wheels on the second wheel support. Hence, a stack of wheels consisting of a set of wheels from a single vehicle, such as an automobile, can be positioned on the first wheel support and then outputted as a stack of cleaned wheels on the second wheel support.

The wheel cleaning device can comprise a control unit connected to one or more sensors for detecting the presence and/or position and/or height of one or more wheels for automatic control of the one or more wheel engaging elements, and optionally also the conveyor, to handle the stack of wheels to be cleaned and output the stack of cleaned wheels. For example, the first and second wheel supports and optionally also the conveyor can be controlled by the control unit, which control unit can be connected to a timing device and/or the one or more sensors for detecting the position and/or presence of one or more wheels on the first wheel support and the second wheel support. Hence, the cleaning device can be arranged for handling and cleaning a stack of wheels automatically in an efficient manner.

The control unit can be arranged to incrementally raise the first wheel support to position the wheels of the stack in consecutive order for transport to the cleaning zone by means of the conveyor. Similarly, the control unit can be arranged to lower the second wheel support in a corresponding manner for receiving, in consecutive order, the cleaned wheels and form a stack of cleaned wheels.

The conveyor can comprise a belt, rollers or similar engaging a tread of the wheels. The conveyor belt, rollers or similar can extend in a vertical plane for conveying lying wheels at least partially in a horizontal direction. Hence, the sides of the wheels are accessible for efficient cleaning from above and from below. Further, the wheel conveyor can comprise a clamping device biasing the wheels towards the conveyor belt, rollers or similar, wherein wheels are conveyed in a reliable manner and also wheels of different size, such as different radius, can be conveyed in an efficient and reliable manner.

The present invention also relates to a method for cleaning vehicle wheels having a rim and a tyre mounted on said rim, comprising the steps of
a) positioning a stack of wheels to be cleaned at a vertically displaceable wheel engaging element of a wheel conveying system,
b) by means of a wheel conveyor of the wheel conveying system conveying a wheel of the stack of wheels individually and in a lying orientation to a wheel cleaning zone at least partially in a horizontal direction,
c) cleaning the wheel in the wheel cleaning zone,
d) conveying the cleaned wheel from the wheel cleaning zone by means of the wheel conveyor,
e) positioning the cleaned wheel at a predetermined position by means of the conveying system,
f) repeating steps b-e, and thereby outputting a stack of cleaned wheels.

The method can comprise the step of gripping one or more of the wheels by means of the wheel engaging element.

The method can comprise the steps of
a) positioning a stack of wheels to be cleaned on a vertically displaceable first wheel support,
b) by means of a wheel conveying system conveying the uppermost wheel of the stack of wheels individually and in a lying position from the first wheel support to a wheel cleaning zone at least partially in a horizontal direction,
c) cleaning the wheel in the wheel cleaning zone,
d) conveying the cleaned wheel from the wheel cleaning zone to a vertically displaceable second wheel support by means of the wheel conveying system,
e) lowering the second wheel support to a position for receiving another wheel on top of the previous one,
f) raising the first wheel support to align the next wheel thereon with the conveying system, and
g) repeating steps b-f until all wheels of the stack have been cleaned, and thereby providing a stack of clean wheels on the second wheel support.

Further characteristics and advantages of the present invention will become apparent from the description of the embodiments below, the appended drawings and the dependent claims.

SHORT DESCRIPTION OF THE DRAWINGS

Figure 2:
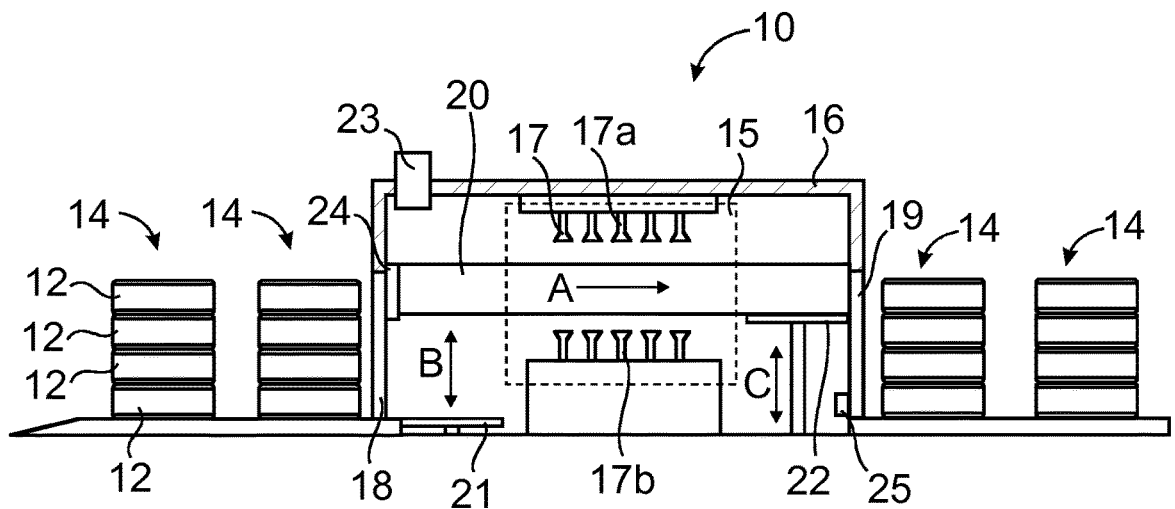
Figure 3:
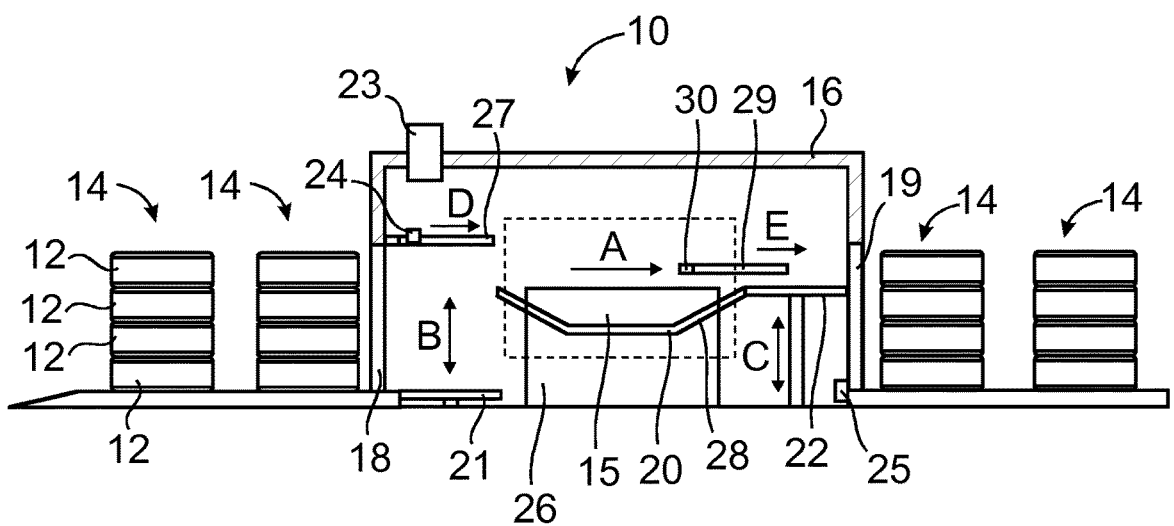
Figure 4:
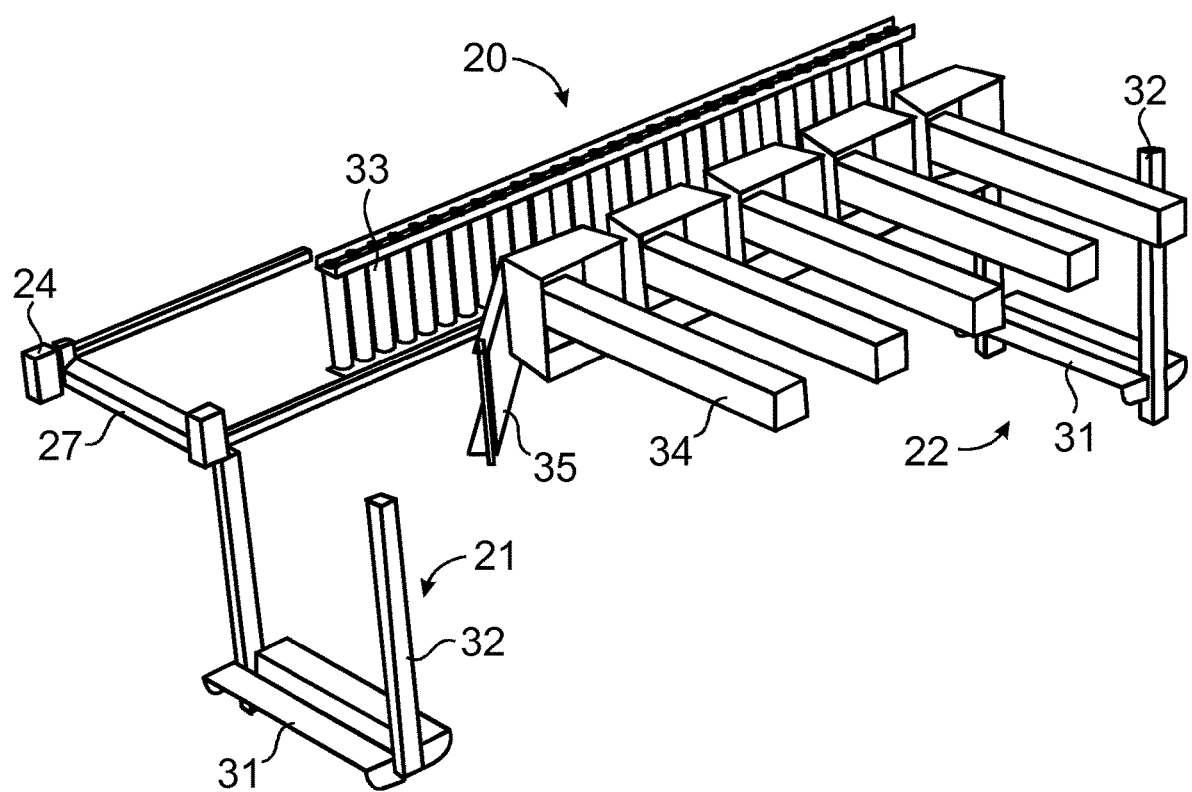
Figure 5:
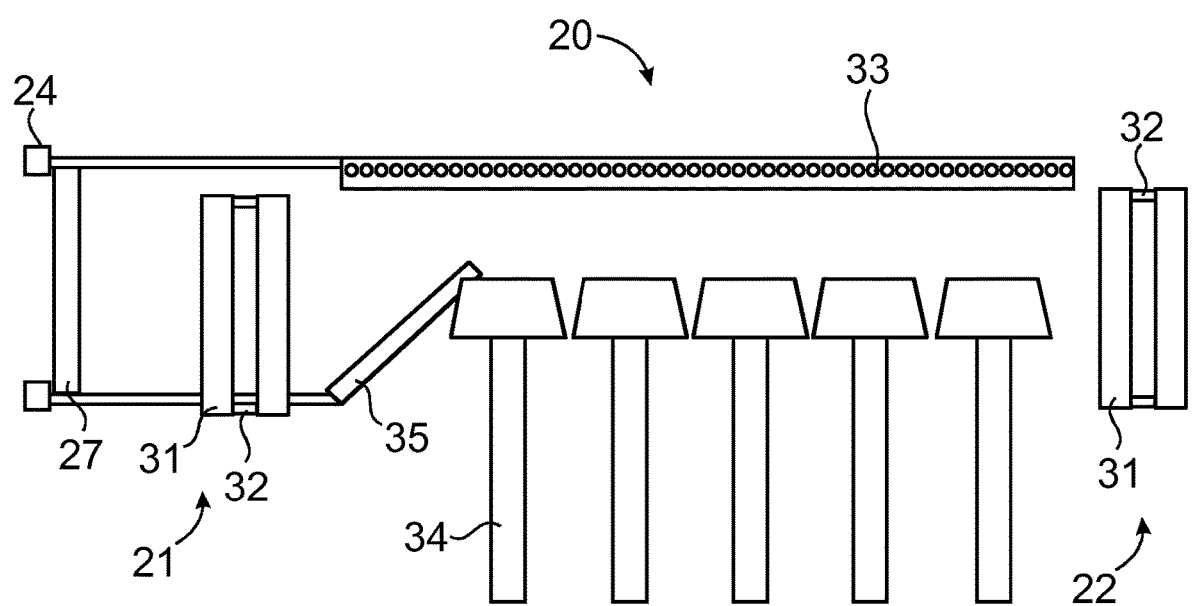
Figure 20:
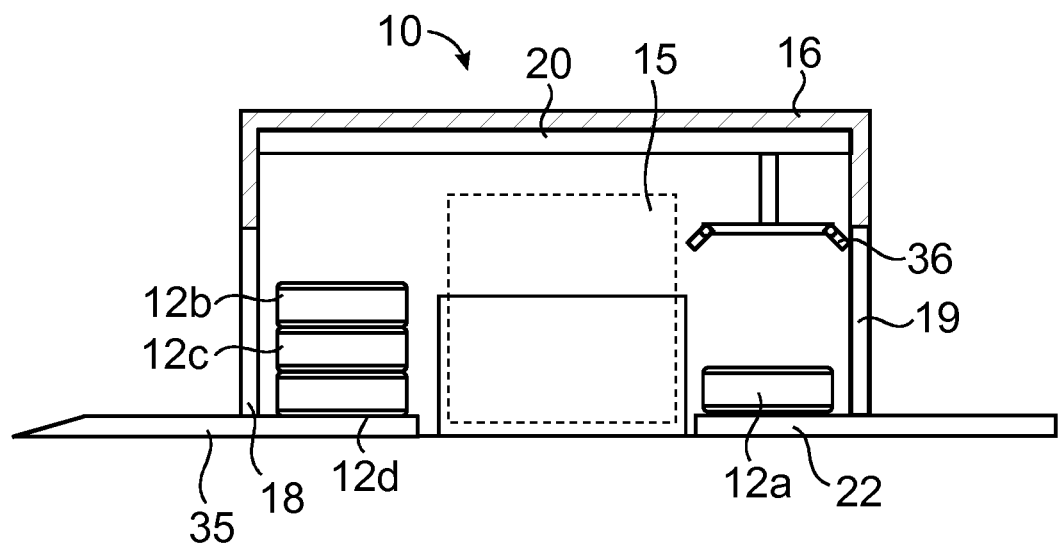
Figure 21:
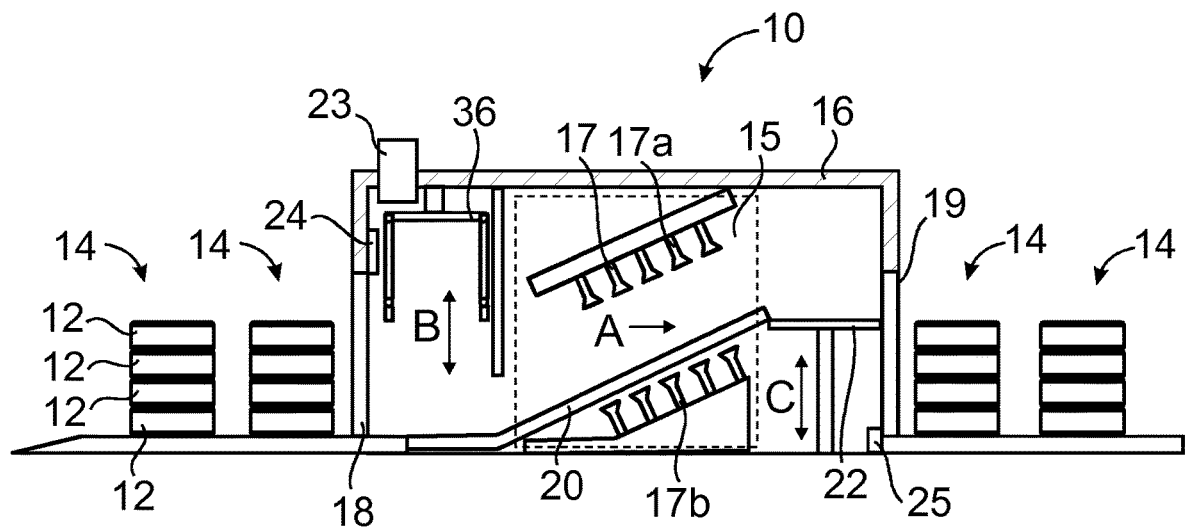
Figure 22:
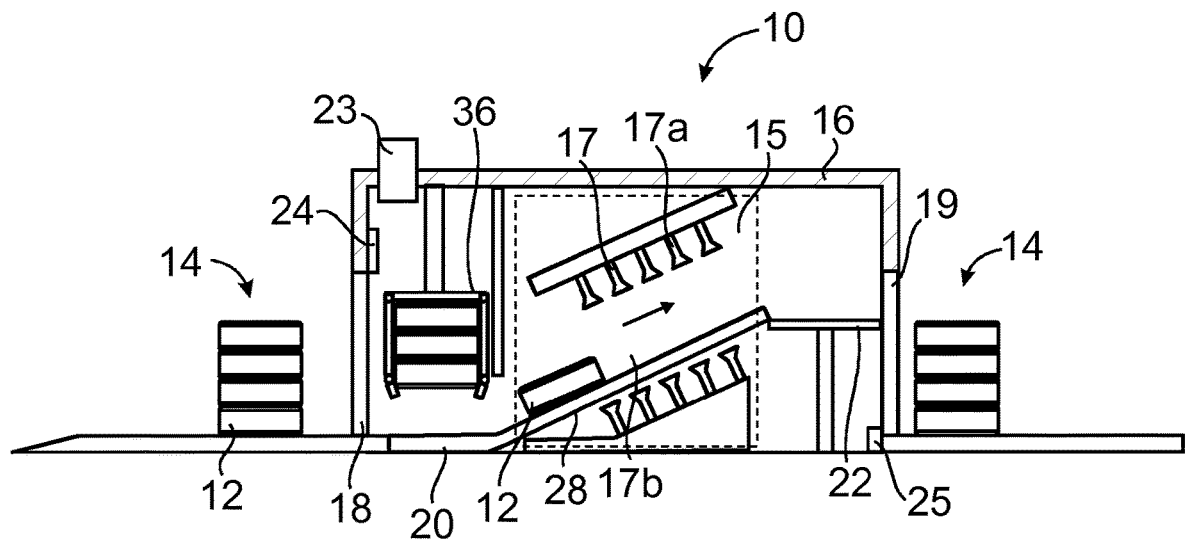

The invention will now be described more in detail with the aid of embodiments and with reference to the appended drawings, in which FIG. 1 is a schematic view of a system for cleaning and handling wheels, including a wheel cleaning device and storage rack for storing wheels according to one embodiment, FIG. 2 is a schematic section view of a wheel cleaning device according to one embodiment, FIG. 3 is a schematic section view of a wheel cleaning device according to one alternative embodiment, FIG. 4 is a schematic perspective view of a part of a wheel cleaning device according to one embodiment, FIG. 5 is a schematic top view of the part of the wheel cleaning device of FIG. 4, FIGS. 6-14 is a series of schematic figures illustrating the operation of the wheel cleaning device and the handling of a set of wheels, FIGS. 15-20 is a series of schematic figures illustrating the operation of the wheel cleaning device and the handling of a set of wheels according to another embodiment, and FIGS. 21 and 22 are schematic figures illustrating a wheel cleaning device according to yet another embodiment.

THE INVENTION

Referring to FIG. 1 a wheel cleaning device 10 and a wheel storage rack 11 of a system for handling and cleaning wheels 12 are illustrated schematically according to one embodiment. For example, the system is arranged for handling, cleaning and storing vehicle wheels 12 having a rim and a tyre mounted thereon. In FIG. 1 a vehicle 13 in the form of an automobile is illustrated schematically and the wheel cleaning device 10 and the wheel storage rack 11 are, for example, installed in a tyre shop or similar, wherein vehicles 13, such as automobiles, trucks, motorcycles and similar, are received for repair, maintenance or change of wheels 12 or tyres. The system is arranged for handling a stack 14 of wheels 12, wherein a full stack 14 consists of a set of wheels 12 from a single vehicle 13, such as two, three, four, six, eight or more wheels. Typically, a set of wheels 12 consists of four wheels from a vehicle 13 in the form of an automobile, wherein said full stack 14 consists of four wheels 12. The stack 14 of wheels 12 consists of a plurality of wheels 12 in a lying position. Herein the expression full stack is used for a stack consisting of all wheels of a vehicle, such as all four wheels of an automobile. It is understood that wheels can be removed from a stack, reducing the number of wheels in the stack until the last wheel of the stack has been removed. Each wheel 12 has a circumferential tread in the radial direction, sides and a centre axis substantially perpendicular to a plane of the surface on which it lies and its sides in parallel to said surface. The sides of the wheels 12 in the stack 14 contact each other and their centre axes are substantially aligned. Normally, the wheels 12 of the stack 14 are arranged substantially horizontally. For example, the lowermost wheel 12 of the stack 14 is arranged on the ground, a floor, a shelf or similar. The wheel cleaning device 10 is arranged for receiving the stack 14 of wheels 12 to be cleaned and is arranged to output a stack 14 of cleaned wheels 12 for further handling, such as storage or mounting on the vehicle 13. The wheel storage rack 11 is arranged for storing a plurality of stacks 14 of wheels 12.

With reference to FIG. 2 the wheel cleaning device 10 is illustrated schematically according to one embodiment. The wheel cleaning device 10 comprises a wheel cleaning zone 15 for cleaning the wheels 12. In the drawings the wheel cleaning zone 15 is indicated by means of dashed lines. For example, the wheel cleaning zone 15 is arranged inside a cleaning chamber 16. Alternatively, the wheel cleaning zone 15 is arranged in an open space, such as outdoors. Alternatively, the wheel cleaning zone 15 is arranged inside a building. The wheel cleaning zone 15 is arranged for cleaning wheels 12 in any suitable manner, such as by means of a cleaning fluid, such as water, detergents, chemical cleaning fluids, pressurized air, steam or similar. Alternatively, the cleaning zone 15 is arranged for cleaning wheels 12 by means of ultrasound, mechanical cleaning devices, such as brushes or similar. Alternatively, the cleaning zone 15 is arranged for cleaning wheels by means of a combination of a cleaning fluid, ultrasound and/or mechanical cleaning devices. In the embodiment of FIG. 2 the wheel cleaning device 10 comprises nozzles 17 for providing a cleaning liquid, such as water and optionally detergents or similar, to the cleaning zone 15 for washing the wheels 12. Alternatively, the nozzles 17 are arranged for providing steam to the cleaning zone 15. The nozzles 17 are, e.g. arranged for spraying the wheels 12 with the cleaning fluid. In the embodiment of FIG. 2 a first nozzle 17a or a first set of nozzles are arranged for spraying cleaning fluid on a top side of the wheel 12, wherein a second nozzle 17b or a second set of nozzles are arranged for spraying an opposite bottom side of the wheel 12. Hence, the first and second nozzles 17a, 17b are arranged for washing opposite sides of the wheel 12 and are arranged opposite to each other. The first nozzle 17a is a top nozzle and is arranged for spraying downwards, wherein the second nozzle 17b is a lower nozzle and is arranged for spraying upwards. In the illustrated embodiment, the nozzles 17a, 17b are arranged inside the cleaning chamber 16. The cleaning chamber 16 comprises an inlet 18 and an outlet 19, wherein the inlet 18 is arranged at one end of the cleaning chamber 16 and the outlet 19 is arranged at the opposite end thereof, and wherein the cleaning zone 15 is arranged between the inlet 18 and the outlet 19. In the illustrated embodiment the inlet 18 is arranged for receiving a stack 14 of wheels 12. Hence, the height of the inlet 18 corresponds to or is larger than the total height of a plurality of lying wheels 12, such as four wheels 12. The height of a stack 14 of wheels 12 corresponds to the total width of the wheels 12. Alternatively, the inlet 18 is arranged for receiving one wheel 12 at a time, wherein the height of the inlet 18 corresponds to or is somewhat larger than the width of a single wheel 12. For example, the maximum width of a single wheel 12 is considered to be less than 400 mm or less than 300 mm for automobile wheels 12. For example, also the outlet 19 is arranged for receiving a stack 14 of wheels 12. Hence, the height of the outlet 19 then also corresponds to or is larger than the total height of a plurality of lying wheels 12, such as four wheels 12.

The wheel cleaning device 10 comprises a wheel conveying system for conveying the wheels 12 to the wheel cleaning zone 15 for cleaning and from the wheel cleaning zone 15 after cleaning. The conveying system comprises a wheel conveyor 20, which is arranged for conveying wheels 12 through the cleaning zone 15 in a travel path, which is illustrated in FIG. 2 by means of the arrow A. The conveyor 20 is arranged for conveying wheels 12 individually and not as the stack 14. For example, the conveyor 20 is arranged for conveying a single wheel 12 through the cleaning zone 15. Alternatively, the conveyor 20 is arranged for conveying a line of wheels 12, continuously or intermittently, through the cleaning zone 15. For example, the conveyor comprises an endless rotating belt or a plurality of rotating rolls, for engaging the tread of the wheels 12, so that the top and bottom sides of the wheels 12 then are accessible for cleaning. For example, the conveyor 20 then is arranged with its wheel engaging surfaces in a vertical plane, e.g. for conveying the wheels 12 at least partly in a horizontal direction through the cleaning zone 15. The conveyor 20 comprises two opposite wheel engaging surfaces for engaging opposite sides of the tread of the wheels 12, wherein the wheels 12 are clamped between said parts and conveyed through the cleaning zone 15. In FIG. 2 only one part of the wheel conveyor 20 is illustrated, wherein an opposite part is not illustrated. Also, in FIG. 2 the conveyor 20 is arranged inside the cleaning chamber 16, for conveying the wheels 12 substantially from the inlet 18 to the outlet 19 through the cleaning zone 15.

The wheel conveying system of the wheel cleaning device 10 comprises a vertically displaceable wheel engaging element, which in the embodiment of FIG. 2 is arranged as a vertically displaceable first wheel support 21 for supporting a stack 14 of wheels 12 to be cleaned. The first wheel support 21 is displaceable in a direction illustrated by means of the arrow B in FIG. 2. Hence, the first wheel support 21 is displaceable at least partially in the vertical direction and can be raised and lowered. For example, the first wheel support 21 is arranged as a hoist. For example, the first wheel support 21 is arranged for lifting wheels 12 in a direction substantially perpendicular to the travel path of the conveyor 20. In the illustrated embodiment the first wheel support 21 is arranged inside the cleaning chamber 16. Alternatively, the first wheel support 21 is arranged next to the cleaning zone 15 in an open structure or outside the cleaning chamber 16. The first wheel support 21 is arranged for receiving and supporting a stack 14 of wheels 12 and to be raised for feeding the wheels 12 to the conveyor 20. Hence, the first wheel support 21 is arranged for initially supporting a full stack 14, after which wheels are removed from the stack until the first wheel support 21 is empty. Then the first wheel support 21 is arranged to be lowered to its original position for receiving another stack 14 of wheels 12.

The wheel conveying system of the wheel cleaning device 10 of FIG. 2 also comprises another vertically displaceable wheel engaging element, which in the embodiment of FIG. 2 is arranged as a vertically displaceable second wheel support 22 for receiving cleaned wheels 12. The second wheel support 22 is displaceable in a direction illustrated by means of the arrow C in FIG. 2. Hence, also the second wheel support 22 is displaceable at least partially in the vertical direction and can be raised and lowered. For example, also the second wheel support 22 is arranged as a hoist. For example, the second wheel support 22 is displaceable in a plane parallel to the first wheel support 21. In the illustrated embodiment the second wheel support 22 is arranged inside the cleaning chamber 16. Alternatively, the second wheel support 22 is arranged next to the cleaning zone 15 in an open structure or outside the cleaning chamber 16. The cleaning zone 15 is arranged between the first and second wheel supports 21, 22. The conveyor 20 is arranged for conveying the wheels 12 from the first wheel support 2 to the second wheel support 22 through the cleaning zone 15, wherein the wheels 12 of the stack 14 are conveyed individually and in consecutive order from the first wheel support 21 to the second wheel support 22 via the wheel cleaning zone 15 at least partially in the horizontal direction A to output a stack 14 of cleaned wheels 12 on the second wheel support 22. Hence, the second wheel support 22 is arranged for receiving a cleaned wheel 12 by the conveyor 20 and to be lowered for receiving another cleaned wheel 12 until the stack 14 of clean wheels 12 is arranged on the second wheel support 22. Hence, the second wheel support 22 is arranged for forming a full stack 14 of cleaned wheels 12 thereon. Then the second wheel support 22 is arranged to be raised to its original position for receiving the first wheel 12 of another stack 14 of wheels 12. Hence, the wheel cleaning device 10 is arranged for receiving a full stack of wheels, clean the wheels thereof and output a full stack 14 of cleaned wheels 12 on the second wheel support 22. The full stack 14 of cleaned wheels 12 is then removed from the second wheel support 22 manually or automatically, such as by means of a pushing device, a conveyor or similar for storage or further handling.

The wheel cleaning device 10 comprises a control unit 23 for controlling the operation of the first and second wheel supports 21, 22 and optionally also the operation of the conveyor 20 and/or the nozzles 17 or any other operable devices for cleaning in the cleaning zone 15. Hence, the control unit 23 is arranged for controlling the operation of the cleaning device 10 or components thereof. The control unit 23 is, e.g., connected to one or more sensors for controlling the operation of the first and second wheel supports 21, 22. In the illustrated embodiment the control unit 23 is connected to a first sensor 24 for detecting a stack 14 of wheels 12 on the first wheel support 21 or for detecting a wheel in a predetermined position. The first sensor 24 is, for example, an optical sensor or a mechanical-electrical sensor for detecting the presence of a wheel at a predetermined position, such as at a predetermined height. For example, the first sensor 24 is arranged for measuring or sensing the height of a lying wheel 12 (i.e. corresponding to the width of the tyre or wheel) and/or the stack 14 of wheels 12. The control unit 23 is arranged to raise the first wheel support 21, e.g., incrementally, to position the uppermost wheel 12 of the stack 14 for engagement by the conveyor 20 until the first wheel support 21 is empty and then to lower the first wheel support 21 to its original position. In the illustrated embodiment the control unit 23 is also connected to a second sensor 25. The second sensor 25 is arranged for detecting wheels on the second wheel support 22. The second sensor 25 is, e.g. an optical sensor or a mechanical-electrical sensor for detecting wheels 12 in a predetermined position. For example, the second sensor 25 is arranged for measuring or sensing the height of a lying wheel 12. The control unit 23 is arranged to lower the second wheel support 22 a distance corresponding to the height of a lying wheel 12 (i.e. a distance corresponding to the width of the wheel 12) until the stack 14 of wheels 12 is arranged on the second wheel support 22 and then to raise the second wheel support 22 to its original position when the stack 14 of wheels 12 has been removed from the second wheel support 22.

With reference to FIG. 3 an alternative embodiment of the wheel cleaning device 10 is illustrated schematically. Also in the embodiment of FIG. 3, the wheel cleaning device 10 comprises the cleaning chamber 16 with the cleaning zone 15, the wheel conveying system with the conveyor 20 and two wheel engaging elements in the form of the first and second wheel supports 21, 22. In FIG. 3 the cleaning zone 15 is provided with a container 26, such as an open top container, with cleaning fluid, wherein the conveyor 20 is arranged for conveying the wheels 12 into and out of the container 26. The wheels 12 are submerged in the cleaning fluid inside the container 26. Optionally, the wheels are subjected to ultrasound inside the container 26 for cleaning thereof. For example, the container 26 is arranged for receiving a single wheel 12 at a time or for receiving a plurality of wheels at the same time.

In FIG. 3 the conveying system also comprises a pushing unit 27, and inclined conveyor elements 28, wherein the conveyor 20 with the inclined conveyor elements 28 is arranged for supporting a bottom side of lying wheels 12 and conveying the wheels 12 partially in the horizontal direction A through the cleaning zone 15. As illustrated in FIG. 3 the wheels are conveyed also in the vertical direction, such as down into the container 26 and up from the container 26. For example, the wheels 12 are conveyed obliquely into and out of the container 26 by means of the inclined conveyor elements 28, wherein the travel path is both horizontally and vertically. For example, the conveyor 20 and the inclined conveyor elements 28 are arranged for conveying wheels 12 continuously through the cleaning zone 15. Alternatively, the conveyor 20 with the inclined conveyor elements 28 is arranged for conveying one wheel 12 into the container 26 and then stop for a predetermined period of time before conveying the cleaned wheel out of the container 26 and to the second wheel support 22. The pushing unit 27 is arranged for pushing one wheel 12 at a time from the first wheel support 21 to the conveyor 20 or an inclined conveyor element 28 thereof, which is illustrated by means of the arrow D in FIG. 3. Hence, the pushing unit 27 is arranged for pushing wheels 12 in a direction substantially horizontally. For example, the pushing unit 27 is connected to the control unit 23 and is activated when the first sensor 24 has detected a wheel 12 in a predetermined position. Then, when the uppermost wheel 12 on the first wheel support 21 has been pushed away the first sensor 24 no longer detects a wheel 12 and sends a signal to the control unit 23 to raise the first wheel support 21. Optionally, the cleaning device 10 comprises another pushing unit 29 for pushing cleaned wheels 12 from the conveyor 20 or an inclined conveyor element 28 thereof to the second wheel support 22, which is illustrated by means of the arrow E in FIG. 3. For example, the other pushing unit 29 is also arranged for pushing wheels 12 substantially horizontally. For example, the control unit 23 is connected to a third sensor 29 for detecting a cleaned wheel 12 in a position for pushing onto the second wheel support 22 or onto another wheel 12 arranged thereon. When a cleaned wheel 12 has been pushed onto the second wheel support 22 this is detected by the second sensor 25, wherein the control unit 23 activates lowering of the second wheel support 22 a distance for receiving the next wheel 12 to form a stack 14 thereon.

With reference to FIGS. 4 and 5 a part of the cleaning device 10 is illustrated schematically, wherein the first wheel support 21, the conveyor 20 and the second wheel support 22 are illustrated according to one embodiment. The first wheel support 21 comprises a platform 31 and one or more uprights 32, wherein the platform is 31 arranged for engaging a lying wheel 12 and for supporting a stack 14 of wheels 12, and wherein the platform 31 is displaceable along the uprights 32 by means of a motor (not illustrated). The second wheel support 22 is arranged in a corresponding manner in the embodiment of FIGS. 4 and 5 and comprises the platform 31 and the uprights 32. The pushing unit 27 for pushing a wheel 12 from the first wheel support 21 and into the conveyor 20 is provided. The pushing unit 27 is arranged for pushing the uppermost wheel 12 in the stack 14 on the first wheel support 21 or the only remaining wheel 12 on the first wheel support 21 from the first wheel support 21 and into the conveyor 20. In the embodiment of FIGS. 4 and 5 the conveyor 20 is arranged for engaging the tread of lying wheels 12, wherein the wheels 12 are conveyed in a lying position and at least partially in the horizontal direction, wherein the sides of the wheels 12 are accessible for cleaning during transport through the cleaning zone 15. The conveyor 20 comprises a plurality of conveyor rollers 33 for conveying the wheels 12. The conveyor rollers 33 are arranged with a vertical axis for transporting the wheels 12 horizontally. Alternatively, the conveyor 20 comprises a conveyor belt, chains or similar for engaging the tread of lying wheels 12. The conveyor rollers 33 are rotated by a motor (not illustrated). In the embodiment of FIGS. 4 and 5 the conveyor 20 also comprises a plurality of clamping devices 34, which are arranged for pressing the wheels 12 towards the conveyor rollers 33, belt, chains or similar and thereby clamping the wheels 12 between the conveyor rollers 33, belt, chains or similar and the clamping devices 34. For example, the clamping devices 34 are spring biased towards the conveyor rollers 33, belt, chains or similar, wherein the clamping devices 34 are spring biased substantially in a horizontal direction. Hence, the clamping devices 34 are arranged for engaging the tread of the wheels 12, i.e.

in a radial direction against lying wheels 12. Hence, the clamping devices 34 comprises a vertical surface for engaging the tread of the wheels 12. Alternatively, the conveyor 20 comprises two opposite conveyor belts, sets of conveyor rollers 33 or similar, wherein one or more lying wheels 12 are clamped and conveyed between the two belts, sets of conveyor rollers 33 or similar. The conveyor 20 is arranged for conveying wheels 12 individually, for example in a line with one wheel after the other, optionally with a gap between each wheel 12. In the embodiment of FIGS. 4 and 5, the conveying system also comprises a guide element 35 for guiding wheels 12 from the first wheel support 21 and into a gap between the conveyor rollers 33, belt or similar and the clamping device 34.

With reference to FIGS. 6-14 the operation of the cleaning device 10 is illustrated schematically according to one embodiment. In FIGS. 6-14 the cleaning device 10 comprises the cleaning chamber 16 with the nozzles 17 arranged therein. However, it is understood that the general principles of the operation of the cleaning device 10 are applicable to any other types of cleaning zone 15 embodiments with or without the cleaning chamber 16 and also with the first and second wheel supports 21, 22 arranged inside or outside any such cleaning chamber 16.

Figure 6:
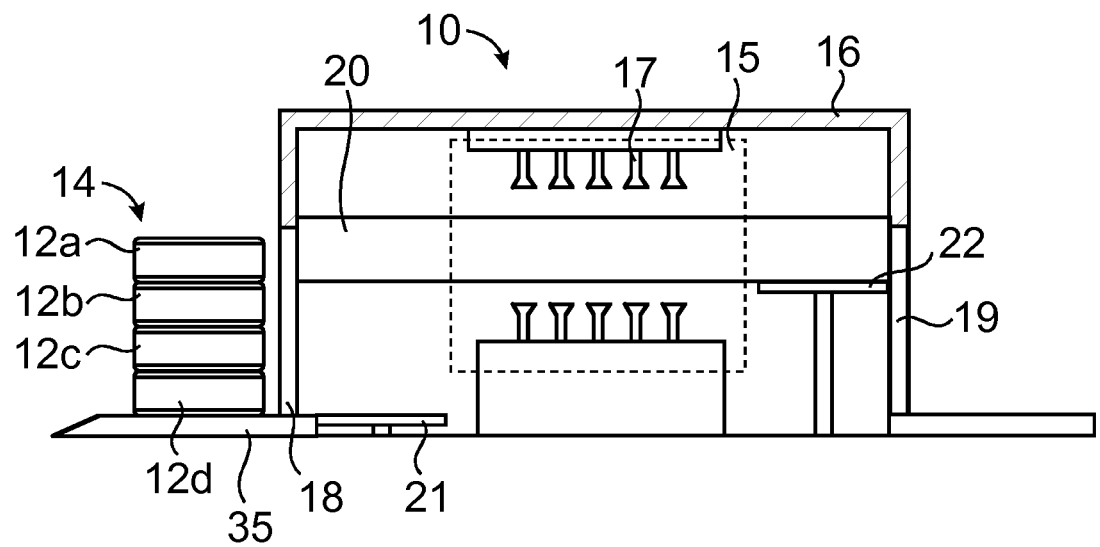
Figure 7:
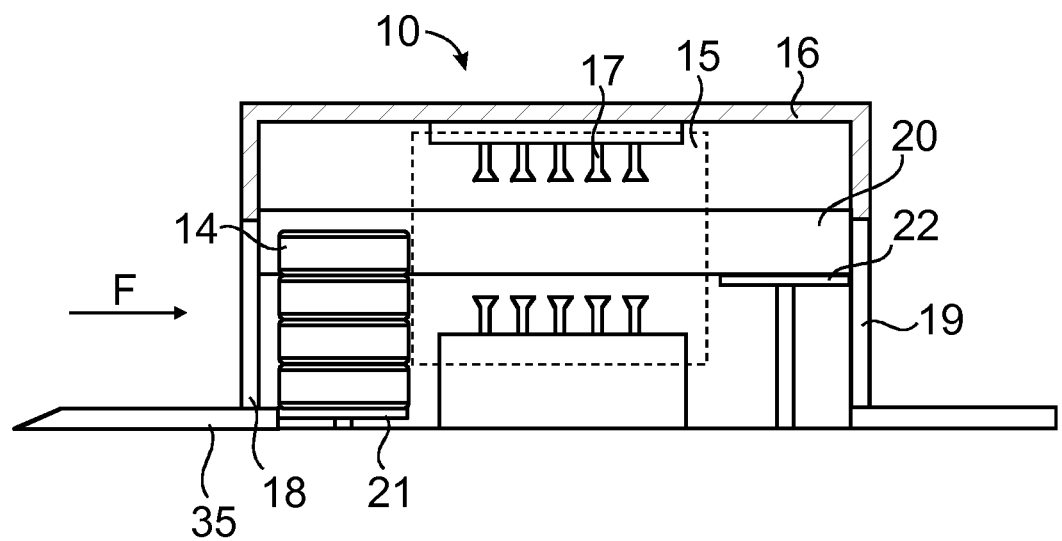
Figure 8:
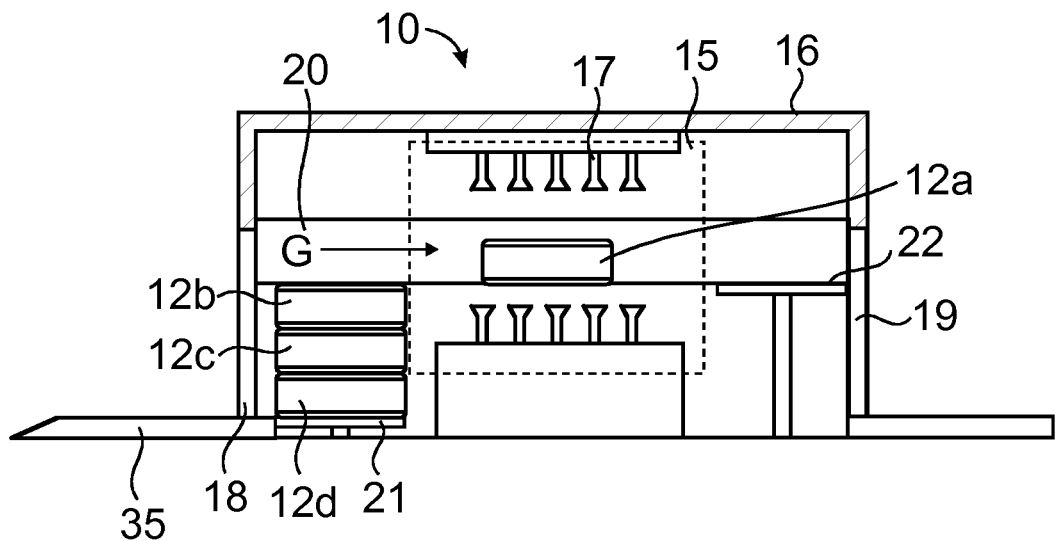

In FIG. 6 a stack 14 of wheels 12 to be cleaned is positioned next to the first wheel support 21. The first wheel support 21 is in its original lower position for receiving a full stack 14. For example, the stack 14 is formed by a set of wheels from an automobile, such as four wheels 12a-12d. The full stack 14 is positioned on the first wheel support 21. For example, the full stack 14 is transferred from an inlet conveyor 35 to the first wheel support 21, wherein the full stack 14 is moved onto the first wheel support 21 in a direction illustrated by means of the arrow F in FIG. 7. Hence, the full stack 14 is moved horizontally to the first wheel support 21. Alternatively, the full stack 14 is positioned on the first wheel support 21 manually, for example by means of a cart. Hence, the full stack 14 is positioned on the first wheel support 21, wherein the first wheel support is in its lower position, which is illustrated in FIG. 7. For example, the full stack 14 is conveyed through the inlet 18 in the cleaning chamber 16 to the first wheel support 21. Then, the uppermost first wheel 12a in the full stack 14 is conveyed from the stack 14 on the first wheel support 21 and into the cleaning zone 15 by means of the conveyor 20, which is illustrated by means of the arrow G in FIG. 8, wherein the first wheel 12a is cleaned. For example, the first wheel 12a is conveyed in the horizontal direction from the first wheel support 21 and into the cleaning zone 15 by means of the conveyor 20. Then, when the first wheel 12a has been cleaned in the cleaning zone 15 it is conveyed to the second wheel support 22 by means of the conveyor 20, which is illustrated by means of the arrow H in FIG. 9. For example, the first wheel 12a is conveyed in the horizontal direction from the cleaning zone 15 to the second wheel support 22. Said second wheel support 22 is in its original upper position for receiving the cleaned first wheel 12a as disclosed in FIG. 8.

Figure 9:
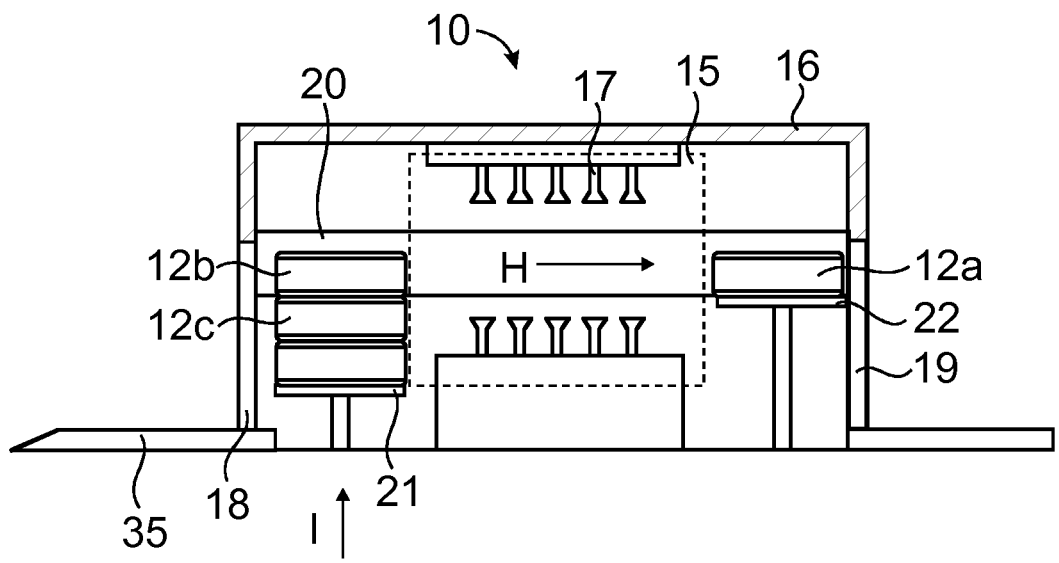
Figure 10:
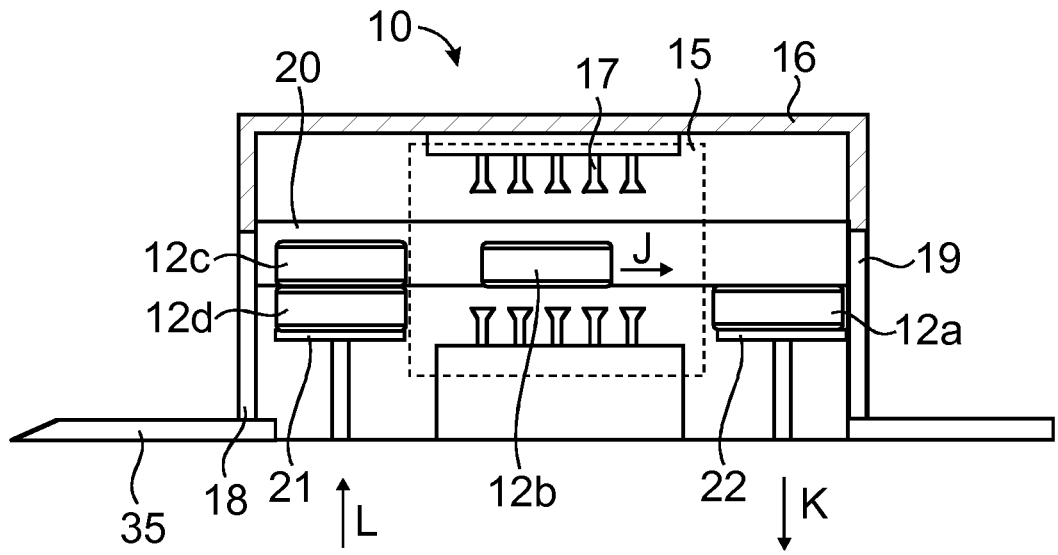
Figure 11:
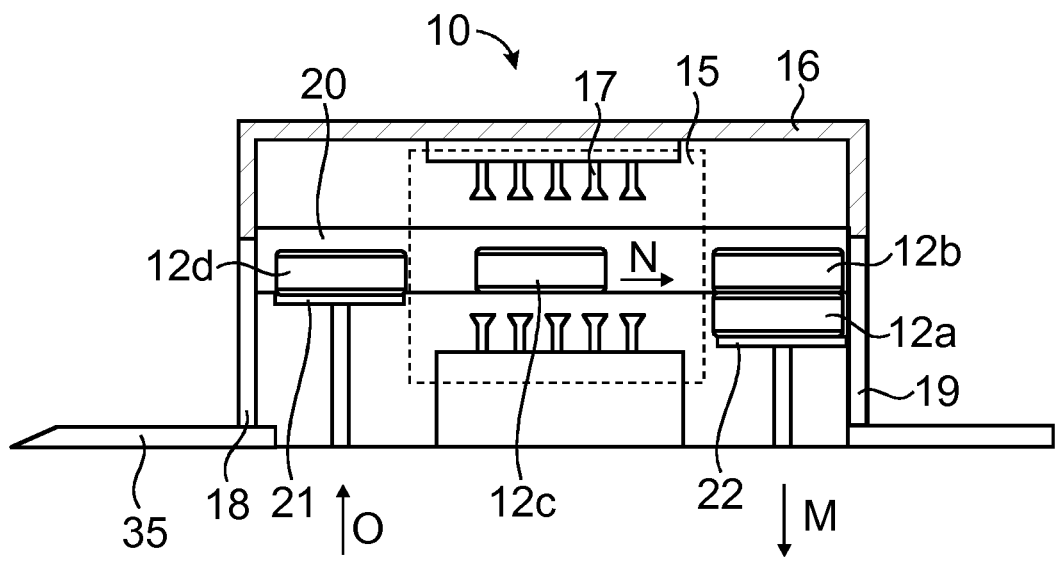
Figure 12:
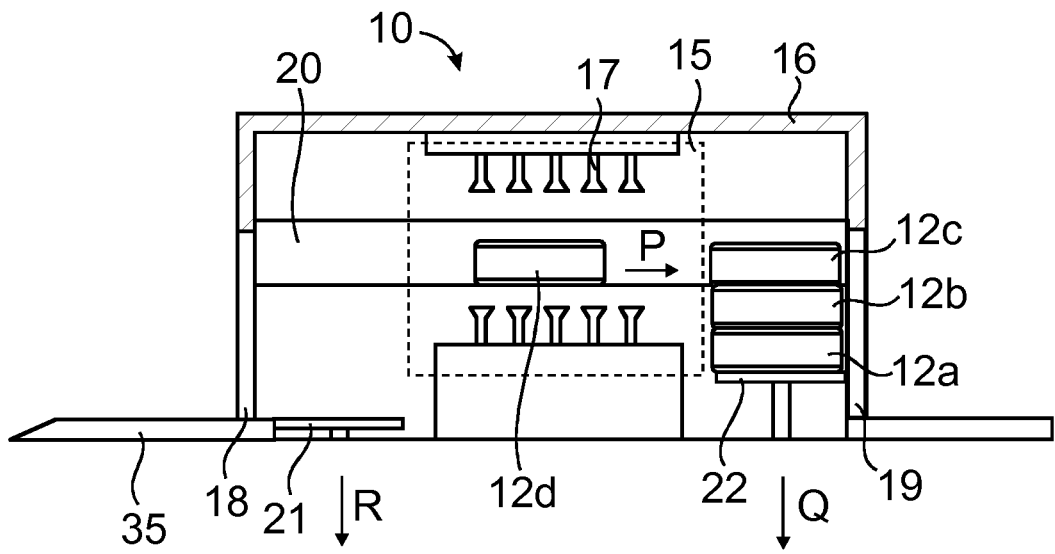
Figure 13:
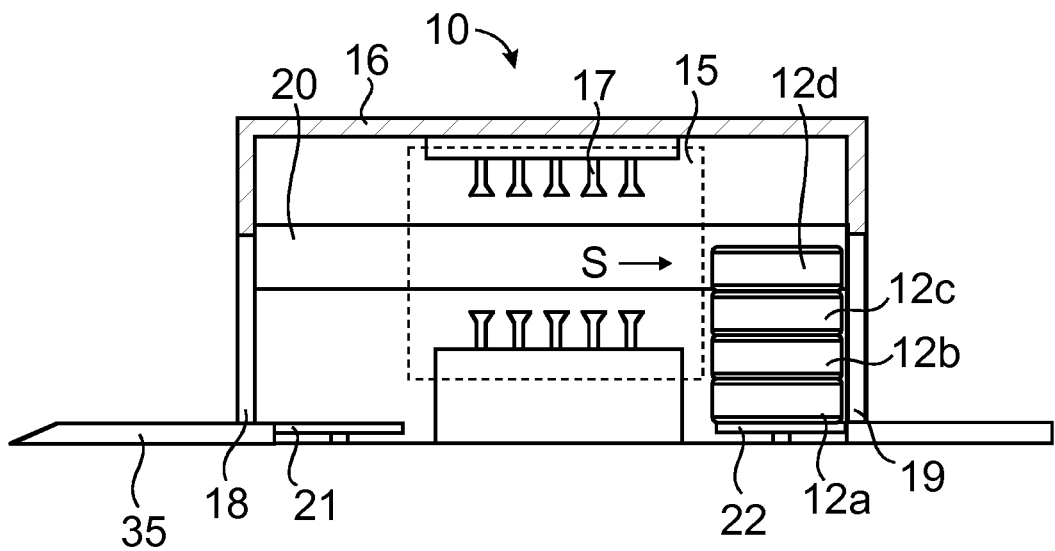
Figure 14:
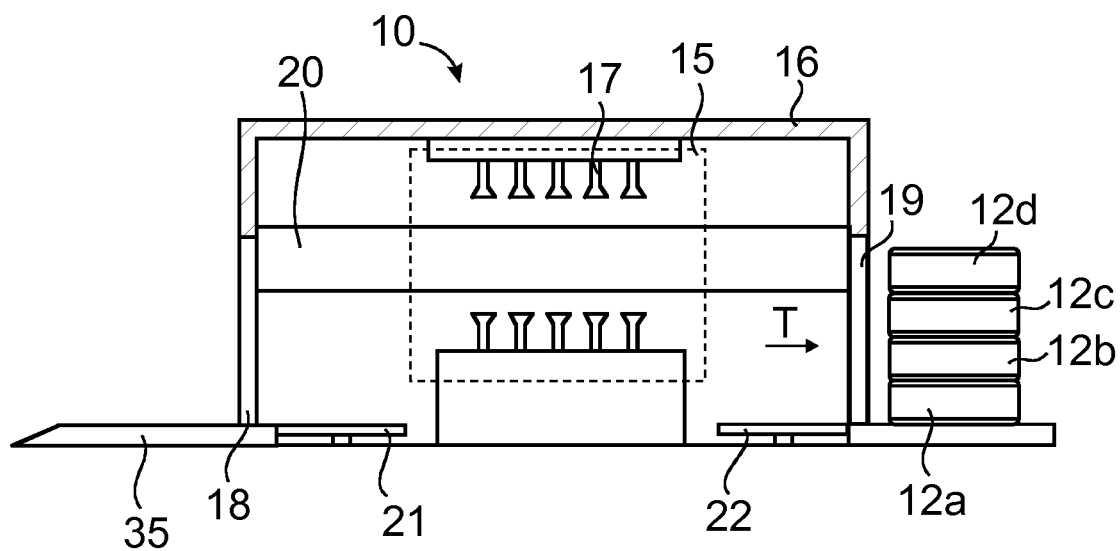

After the first wheel 12a has been removed from the stack 14 the first wheel support 21 is raised, which is illustrated by means of the arrow I in FIG. 9. For example, the first wheel support 21 is raised immediately or shortly after the first wheel 12a has been removed from the stack 14. However, in the illustrated example the first wheel support 21 is raised when the first wheel 12a is conveyed from the cleaning zone 15 to the second wheel support 22. The first wheel support 21 is raised vertically a distance corresponding to a height of a lying wheel or until a second wheel 12b in the stack 14, i.e. the remaining part of the stack, is detected by the first sensor 24 or in any other suitable manner, which is understood by a skilled person in view of the disclosed invention. Hence, the first wheel support 21 is raised until the second wheel 12b is positioned for transport by the conveyor 20 into the cleaning zone 15. Then the second wheel 12b is conveyed by the conveyor 20 into the cleaning zone 15, which is illustrated by means of the arrow J in FIG. 10. The second wheel support 22, carrying the first wheel 12a, is lowered, which is illustrated by means of the arrow K in FIG. 10, to a position for receiving the second wheel 12b. Hence, the second wheel support 22 is lowered a distance corresponding to the height of a lying wheel or to a position in which the top side of the first wheel 12a is aligned with a bottom side of the second wheel 12b, for example by means of the second sensor 25 or in any other suitable manner, which is understood by a skilled person in view of the disclosed invention. Also, after removal of the second wheel 12b from the stack 14 on the first wheel support 21, the first wheel support 21 is raised again to position the third wheel 12c for transport to the cleaning zone 15 by means of the conveyor 20, which is illustrated by means of the arrow L in FIG. 10. The second wheel 12b is conveyed to the second wheel support 22 and positioned on top of the first wheel 12a, wherein the second wheel support 22 is lowered as illustrated by means of the arrow M in FIG. 11. The third wheel 12c is removed from its position on top of the fourth wheel 12d and is conveyed in a direction illustrated by means of the arrow N in FIG. 10 into the cleaning zone 15 for cleaning. After the cleaning of the third wheel 12c in the cleaning zone 15 the third wheel 12c is further conveyed by the conveyor 20 towards the second wheel support 22. After removal of the third wheel 12c from the fourth wheel 12d on the first wheel support 21 the first wheel support 21 is again raised to position the fourth wheel 12d in its place for subsequent transport to the cleaning zone 15, which is illustrated by means of the arrow O in FIG. 11. For example, the fourth wheel 12d is the last in the stack 14, wherein the first wheel support 21 is in its upper position. Optionally, the upper position of the first wheel support 21 is detected, for example, by the first sensor 24. The third wheel 12c is conveyed after cleaning in the direction illustrated by means of the arrow P in FIG. 12 onto the second wheel 12b positioned on top of the first wheel 12a on the second wheel support 22. The fourth wheel 12d is conveyed in the same direction into the cleaning zone 15. After the third wheel 12c has been positioned on top of the other wheels 12a, 12b on the second wheel support 22, the second wheel support 22 is lowered again as illustrated by means of the arrow Q. After the fourth and last wheel 12d has been removed from the first wheel support 21 the first wheel support 21 is lowered to its original lower position for receiving another stack 14 of wheels to be cleaned, as illustrated by means of the arrow R in FIG. 12. After cleaning of the fourth wheel 12d it is conveyed from the cleaning zone 15 to the second wheel support 22 to be positioned on top of the third wheel 12c thereon, which is illustrated in FIG. 13 by means of the arrow S. Hence, a full stack 14 of cleaned wheels 12a-d is formed on the second wheel support 22, which full stack 14 of cleaned wheels is removed from the second wheel support 22, manually or automatically, which is illustrated in FIG. 14 by means of the arrow T. For example, the full stack 14 of cleaned wheels 12a-d is moved through the outlet 19 of the cleaning chamber 16. The cleaning device 10 is arranged to output a full stack 14 of cleaned wheels 12a-d for further handling, such as storage in the storage rack 11 or return to a mounting sight for mounting on the vehicle 13. For example, when the full stack 14 of cleaned wheels 12a-d has been removed from the second wheel support 22 it is raised to its upper position as illustrated in FIG. 6 for receiving the first wheel of another set of wheels from another vehicle 13 to form another stack. Then, the procedure is repeated for cleaning another set of wheels to form another stack of cleaned wheels.

Figure 15:
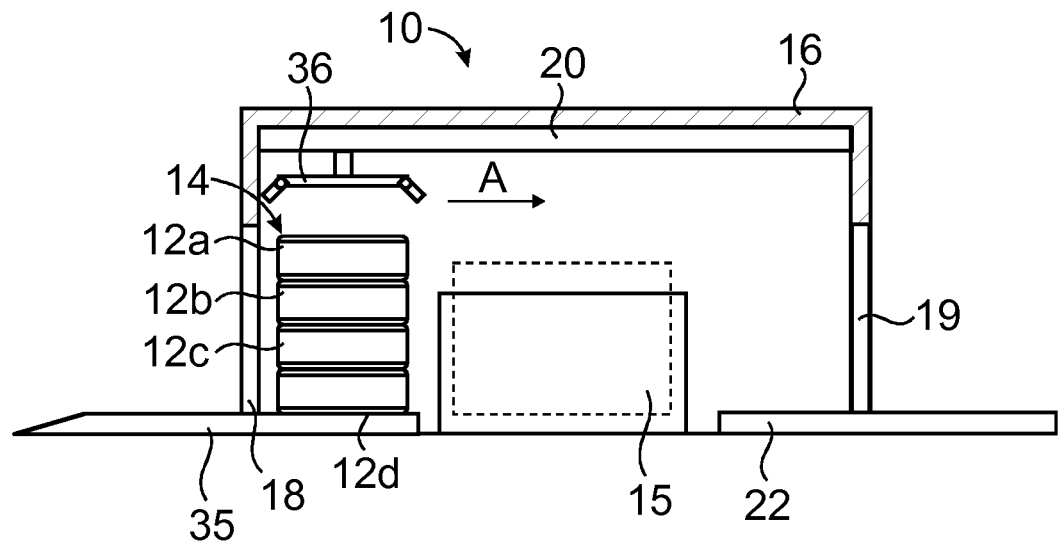
Figure 16:
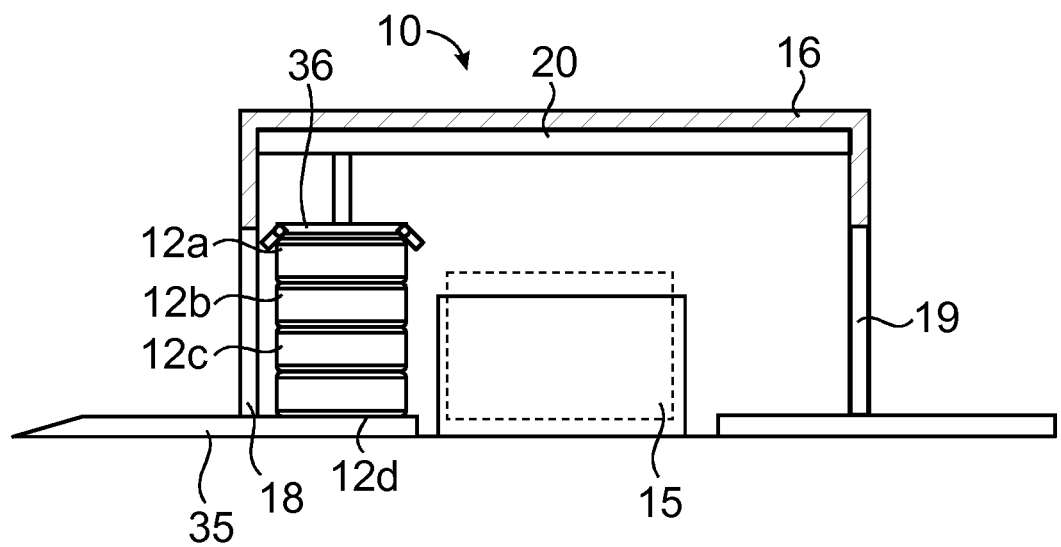
Figure 17:
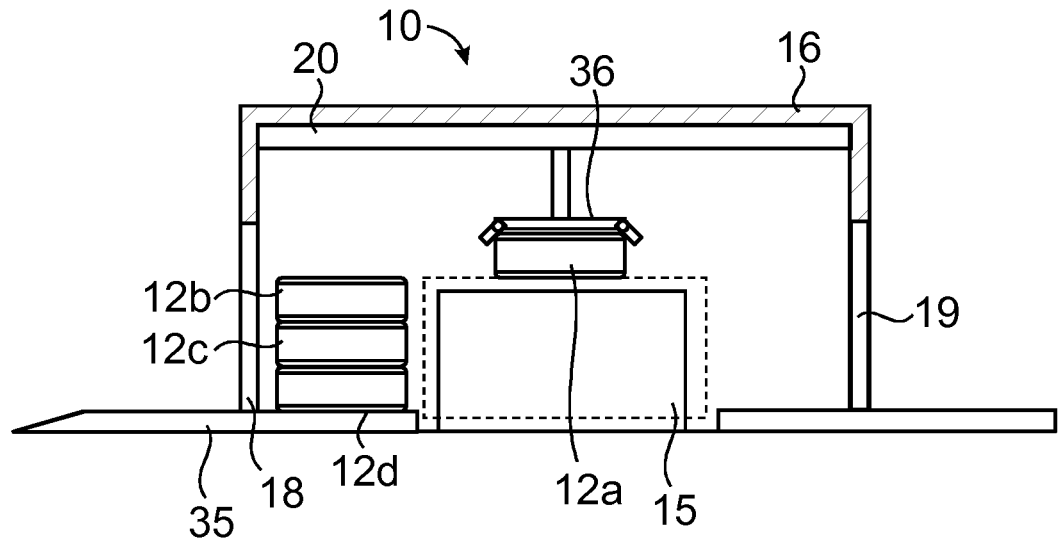
Figure 18:
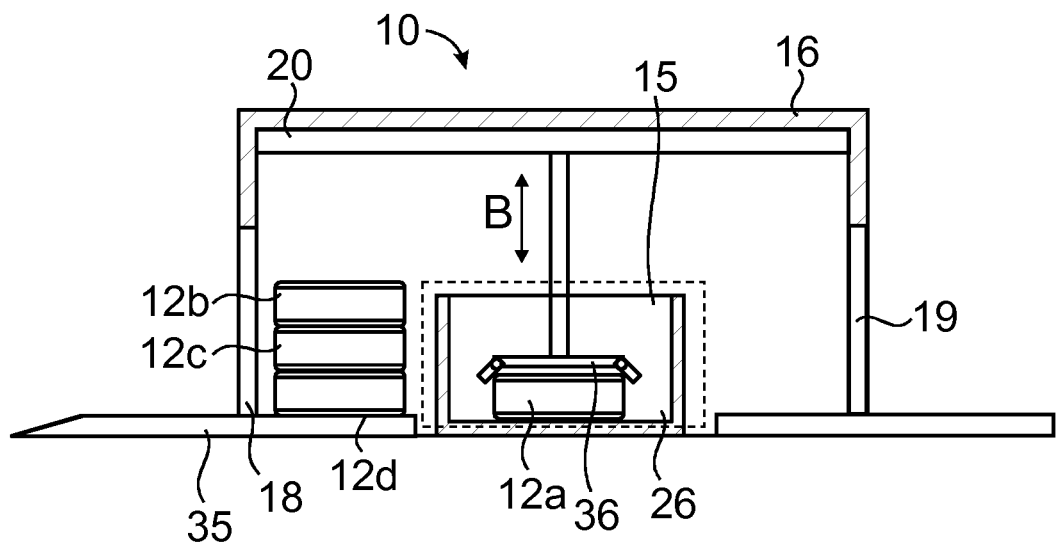
Figure 19:
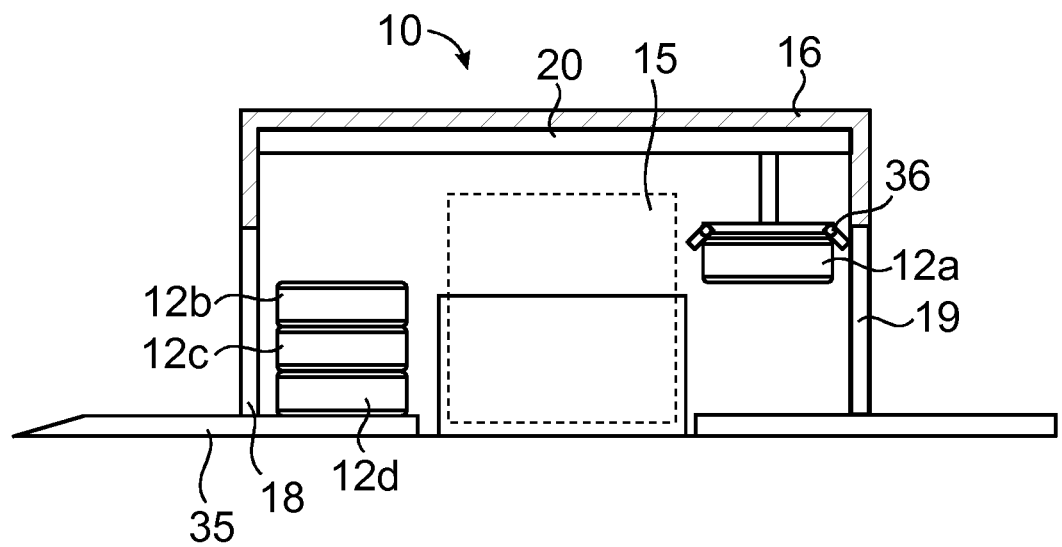

With reference to FIGS. 15-20 another embodiment is illustrated, wherein the wheel cleaning device 10 comprises a wheel engaging element in the form of a vertically displaceable wheel gripping device 36 for gripping a single wheel 12 at a time from the stack 14 of wheels 12a-d. For example, the wheel gripping device 36 is arranged for gripping a lying wheel 12. For example, the wheel gripping device 36 is arranged for engaging the tread of the wheel 12. For example, the stack 14 of wheels is arranged on the first wheel support in the form of the inlet conveyor 35, wherein the wheel gripping device 36 is arranged for retrieving wheels 12 from the inlet conveyor 35. Alternatively, the first wheel support is a fixed wheel support suitable for supporting the stack 14 of wheels to be cleaned, wherein the wheel gripping device 36 is arranged for retrieving wheels 12 from the first wheel support. Hence, the wheel gripping device 36 is displaceable in the vertical direction, wherein it can be raised and lowered. The wheel gripping device 36 is connected to the conveyor 20, wherein the wheel gripping device 36 is displaceable along the conveyor 20. For example, the wheel gripping device 36 and the conveyor 20 are arranged so that the gripping device 36 can be raised, lowered and moved along the conveyor 20 for gripping and transporting wheels 12 to and from the wheel cleaning zone 15. Hence, the wheel gripping device 36 and the conveyor 20 are arranged for picking the uppermost wheel 12 from the stack 14 and transport said wheel 12 to the wheel cleaning zone 15 for cleaning. Then the cleaned wheel 12 is transported from the wheel cleaning zone 15 to a predetermined position, such as the second wheel support 22, by means of the wheel gripping device 36 and the conveyor 20. In the embodiment of FIGS. 15-20. Alternatively, the wheel to be cleaned is transported to the wheel cleaning zone by means of a first wheel gripping device, wherein the cleaned wheel 12 is transported from the cleaning zone 15 to the predetermined position by means of a second wheel gripping device. In the illustrated embodiment the wheel gripping device 36 is suspended from the conveyor 20 and is brought to a position above the stack 14 of wheels to be cleaned, which is illustrated in FIG. 15. The wheel gripping device 36 is displaceable downwards for collecting a wheel, such as the first wheel 12a of the stack 14, which is illustrated in FIG. 16. Hence, the wheel gripping device 36 grips the uppermost first wheel 12a of the stack 14, wherein the wheel gripping device 36 with the first wheel 12a is conveyed along the conveyor 20 to the wheel cleaning zone 15, which is illustrated in FIG. 17. Optionally, the wheel gripping device 36 is raised before transporting the first wheel 12a in the horizontal direction to the cleaning zone 15. Then, the first wheel 12a is cleaned in the cleaning zone, such as by means of the nozzles 17 or by lowering into the container 26 as illustrated in FIG. 18. Optionally, the gripping device 36 releases the first wheel 12a and is raised during cleaning, wherein the first wheel 12a is gripped again after cleaning by the same wheel gripping device 36 or another wheel gripping device (not illustrated). Then, the first wheel 12a is transported by means of the wheel gripping device 36 from the wheel cleaning zone 15 to the second wheel support 22, which is illustrated in FIG. 20, wherein the first wheel 12a is released from the wheel gripping device 36, optionally after lowering a suitable distance. Then the wheel gripping device 20 is returned to its original position above the next wheel 12b of the stack 14, wherein the procedure for the first wheel 12a is repeated for the second and subsequent wheels 12b-d until a stack 14 of cleaned wheels 12 is outputted in the predetermined location. Hence, the second wheel 12b is positioned on top of the first wheel 12a, the third wheel 12c is positioned on top of the second wheel 12b and the fourth wheel 12d is positioned on top of the third wheel 12c after cleaning. Also the embodiment of FIGS. 15-20 is, e.g. provided with suitable sensors and the control unit for automatic operation of the cleaning device 10.

With reference to FIGS. 21 and 22 another embodiment of the wheel cleaning device 10 is illustrated, wherein the wheel engaging device is arranged as the vertically displaceable wheel gripping device 36, wherein the wheel gripping device 36 is arranged for gripping and lifting the entire stack 14 of wheels 12 or for gripping all but one of the wheels 12 of the full stack 14. For example, the wheel gripping device 36 is arranged for gripping a plurality of lying wheels 12. For example, the wheel gripping device 36 is arranged for engaging the tread of the wheels 12. Hence, the wheel gripping device 36 is displaceable in the vertical direction, wherein it can be raised and lowered. In the embodiment of FIGS. 21 and 22 the wheel gripping device 36 is arranged for releasing a single wheel 12 at a time for transport to the wheel cleaning zone 15 by means of the conveyor 20 at least partially in the horizontal direction A.

In FIGS. 21 and 22 the conveyor 20 is arranged for conveying the wheels 12, individually, through the wheel cleaning zone 15 for cleaning thereof. For example, the conveyor 20 is arranged for engaging a bottom side of the wheels 12. Alternatively, the conveyor 20 is arranged for engaging the tread of the wheels 12 as described above. The conveyor 20 comprises inclined conveyor elements 28, wherein the conveyor 20 with the inclined conveyor elements 28 is arranged for supporting a bottom side of lying wheels 12 and conveying the wheels 12 partially in the horizontal direction A through the cleaning zone 15. Hence, the wheels 12 are conveyed also in the vertical direction upwards by the conveyor 20. For example, the wheels 12 are conveyed obliquely through a part of the container 26 by means of the inclined conveyor elements 28, wherein the travel path is both horizontally and vertically. For example, a part of the conveyor 20 form the first wheel support for receiving a stack 14 of wheels 12 to be cleaned. Alternatively, the first wheel support is a separate fixed wheel support.

In the embodiment of FIGS. 21 and 22 the wheel cleaning device 10 also comprises the vertically displaceable second wheel support 22 for receiving the cleaned wheels 12 and form a stack 14 as described with reference to FIGS. 2-14 above. Hence, the wheel support 22 is displaceable in the vertical direction as illustrated by means of the arrow C in FIG. 21, to receive cleaned wheels 12 from the conveyor 20 after cleaning. After receiving a cleaned wheel 12, the wheel support 22 is lowered a distance substantially corresponding to the height of a lying wheel to a position for receiving another cleaned wheel 12 on top of the other.

The invention claimed is:

1. A wheel cleaning device for cleaning vehicle wheels having a rim and a tyre mounted on said rim, said cleaning device comprising a wheel cleaning zone, a wheel support and a wheel conveying system for conveying the wheels to the wheel cleaning zone, and from the wheel cleaning zone to the wheel support, wherein the wheel conveying system comprises at least one vertically displaceable wheel gripping device, and a wheel conveyor extending at least partially in a horizontal direction, wherein the gripping device is arranged for gripping a single wheel from a stack of wheels by engaging the tread of the wheel and conveying said single wheel in a horizontal position, and wherein said gripping device is suspended from and movable in the horizontal direction by means of the wheel conveyer, wherein the wheel conveying system is arranged for conveying wheels individually, in consecutive order and in the horizontal position from a stack of wheels from a single vehicle to the wheel cleaning zone at least partially in the horizontal direction and then from the wheel cleaning zone to a wheel support at least partially in the horizontal direction to output a stack of cleaned wheels for said single vehicle on the wheel support.

2. The wheel cleaning device according to claim 1, comprising a control unit for automatically controlling the operation of the at least one wheel gripping device and the wheel conveyor.

3. The wheel cleaning device according to claim 2, comprising one or more sensors connected to the control unit, wherein the one or more sensors is/are arranged for detecting a wheel in a predetermined position and/or a stack of wheels in a predetermined position and/or the height of a wheel.

4. The wheel cleaning device according to claim 1, wherein the cleaning zone comprises nozzles arranged above and below a travelling path of the wheels for providing a cleaning fluid to the cleaning zone for cleaning the wheels.

5. The wheel cleaning device according to claim 1, wherein the cleaning zone comprises a container with a cleaning liquid for receiving wheels to be cleaned.

6. A method for cleaning vehicle wheels having a rim and a tyre mounted on said rim, comprising the steps of a) positioning a set of wheels from a single vehicle as a stack of wheels to be cleaned at an inlet conveyer, wherein a vertically displaceable wheel gripping device suspended from a wheel conveyer of a wheel conveying system is arranged for retrieving wheels from the inlet conveyer, b) by means of the gripping device, gripping a single wheel from the stack of wheels by engaging the tread of the wheel, c) by means of the wheel conveyor of a wheel conveying system conveying the gripping device with the wheel in a horizontal position to a wheel cleaning zone at least partially in a horizontal direction, d) cleaning the wheel in the wheel cleaning zone, e) conveying the cleaned wheel from the wheel cleaning zone by means of the gripping device and the wheel conveyor at least partially in the horizontal direction, f) positioning the cleaned wheel at a predetermined position by means of the gripping device, g) repeating steps b-f for the next wheel from the stack of wheels, wherein the predetermined position in step f is on top of the previous cleaned wheel, and thereby outputting a stack of cleaned wheels for said single vehicle.

7. The method according to claim 6, comprising the step of automatically controlling the operation of the wheel gripping device and the conveyor by means of a control unit.

8. The method according to claim 7, comprising the step of automatically controlling the operation of the wheel gripping device by means of one or more sensors connected to the control unit.

9. The method according to claim 8 comprising the steps of detecting presence of or a height of a wheel and/or the stack of wheels by means of said one or more sensors.

\* \* \* \* \*